United States Patent [19]

Hodsdon et al.

[11] Patent Number: 5,146,615
[45] Date of Patent: Sep. 8, 1992

[54] INTERCHANGEABLE CONTROL PANELS AND KEYPADS FOR RADIO TRANSCEIVERS AND RELATED PROCESS

[75] Inventors: Roy F. Hodsdon; Douglas M. Dickson, both of Lynchburg, Va.

[73] Assignee: Ericsson GE Mobile Communications Holding Inc., Lynchburg, Va.

[21] Appl. No.: 390,254

[22] Filed: Aug. 7, 1989

[51] Int. Cl.⁵ .............................................. H04B 1/38
[52] U.S. Cl. ..................................... 455/90; 455/128; 455/351; 340/711
[58] Field of Search .................... 455/89, 90, 128, 347, 455/348, 349, 351, 343; 200/309; 340/711; 341/22, 23

[56] References Cited

U.S. PATENT DOCUMENTS

| | | | |
|---|---|---|---|
| 3,959,610 | 5/1976 | Finnegan et al. | 455/90 |
| 4,066,850 | 1/1978 | Heys, Jr. | 200/309 |
| 4,119,839 | 10/1978 | Beckmann et al. | 341/23 |
| 4,471,493 | 9/1984 | Schober | 455/90 |
| 4,621,373 | 11/1986 | Hodsdon | 455/90 |
| 4,688,020 | 8/1987 | Kuehneman et al. | 341/23 |
| 4,870,531 | 9/1989 | Danek | 340/911 |
| 4,890,832 | 1/1990 | Komaki | 341/23 |

Primary Examiner—Curtis Kuntz
Assistant Examiner—Edward Urban
Attorney, Agent, or Firm—Nixon & Vanderhye

[57] ABSTRACT

A radio transceiver comprising a housing including a front cover, a plurality of interchangeable control panels adapted for selective alternative attachment to the front cover, and a plurality of interchangeable keypads adapted for selective alternative attachment to the front cover in underlying relationship with a respective one of the control panels, wherein each control panel is configured for use with a similarly configured one of the keypads. Each of the control panels comprises a relatively thin planar member having front and rear faces and defined by upper, lower and a pair of side edges, and includes a projection or locking bar extending along and away from the upper edge, and fastening means located adjacent the lower edge. A standardized electronic circuit board is provided within the unit, some or all of the switches included on the circuit being accessible, depending on the particular keypad and control panel employed.

4 Claims, 4 Drawing Sheets

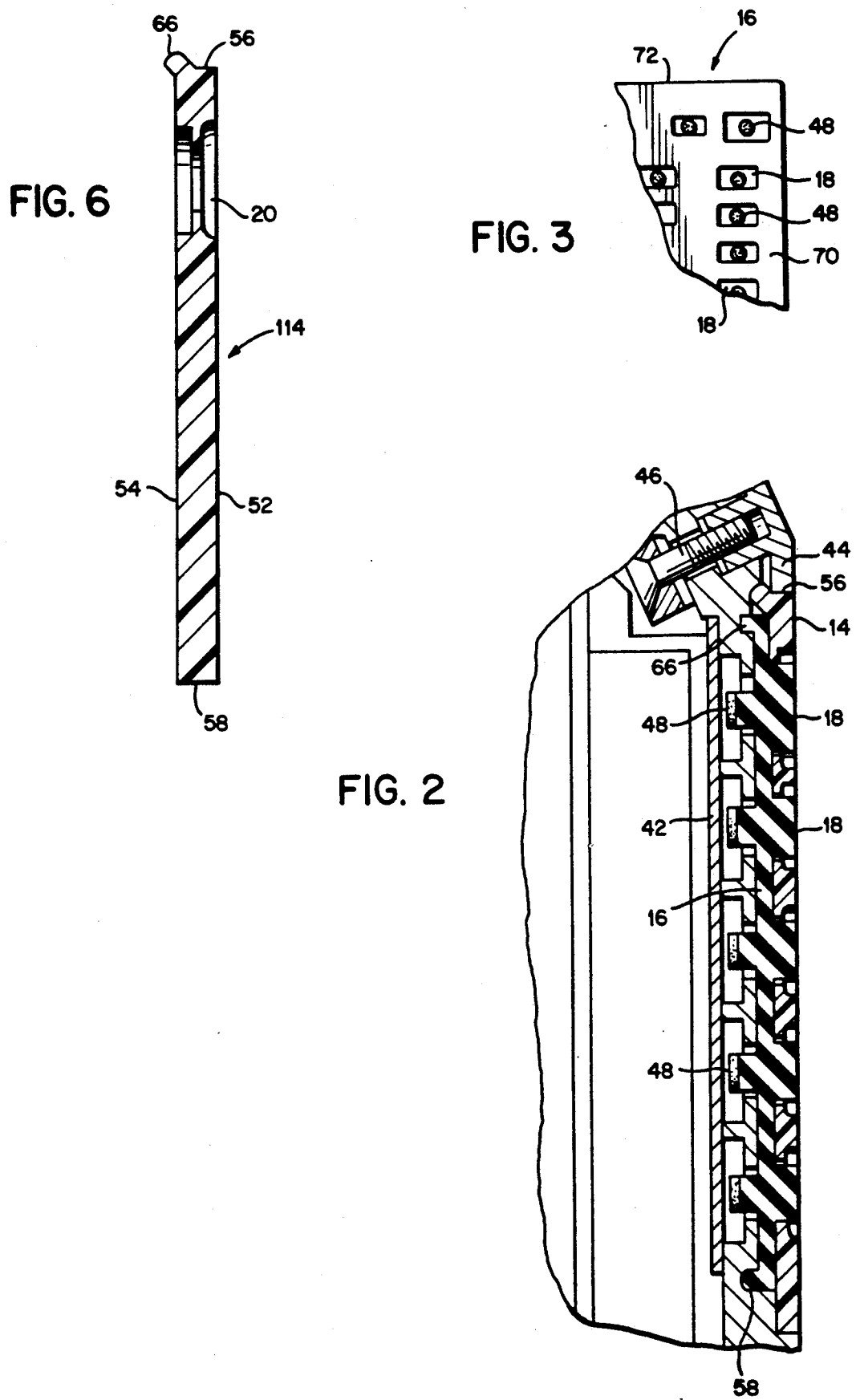

INTERCHANGEABLE CONTROL PANELS AND KEYPADS FOR RADIO TRANSCEIVERS AND RELATED PROCESS

BACKGROUND AND SUMMARY OF THE INVENTION

This invention relates generally to radio transceiver units, and in particular, to interchangeable front control panel and keypad assemblies for such units.

For marketing and other reasons, manufacturers of radio communications devices typically offer several different configurations for each communications product manufactured. A particular model of mobile radio transceiver may have a "basic" or minimal configuration but may optionally be provided with additional features or "options" at additional cost.

For example, a basic transceiver configuration may provide communications over a limited number of communications channels for basic radio transmitting and receiving functions required by all users. Some users may, however, have additional requirements requiring additional features—such as additional communications channels, receiver channel scanning, etc. The ability of a manufacturer to provide such additional "options" permits increases in the flexibility, versatility, desirability and range of applications of the product without penalizing purchasers of the basic configuration with increased cost. Purchasers of the basic model pay a minimum price for the minimal configuration, while users requiring additional "option" features pay an increased price based on the number and type of options required.

In the past, additional options were generally provided by incorporating additional components and circuitry into the device. For example, in the past, channel scanning capability or additional operating channels were added by installing additional frequency selection circuitry into the transceiver. Similarly, the tone activated squelch option typically required an additional tone decoder circuit to be installed. Transceiver designers used modular architectures to accommodate additional plug-in "option modules".

An example of this design approach is the prior art "MLS" series radio transceivers manufactured for General Electric Company by Japan Radio Corp. These "MLS" transceivers include basic transceiver circuitry disposed within a housing. The front panel assembly of the transceiver housing was manufactured separately, and consists of a separable front panel "escutcheon" plate. Mechanically mounted to the escutcheon plate is a printed circuit board which plug-connects to the basic transceiver circuitry when the escutcheon plate is mechanically fastened to the housing. The escutcheon plate and associated printed circuit board comprises a module separable from the transceiver main housing and basic circuitry. The module includes user controls mounted on the escutcheon plate and circuitry required to connect user controls mounted on the plate to the transceiver circuitry.

Since different "option" features in many cases require different additional user controls, different models of escutcheon plate modules were produced for the "MLS" series transceivers. In particular, the "MLS" transceiver was made available in five different versions: (1) a two-channel "basic" version; (2) an 8-channel version with the scan feature; (3) a 16-channel version without scan; and (4) a 16-channel version with scan feature. Five different interchangeable escutcheon plates with different user control arrangements corresponding to these five different transceiver versions were also made. The particular escutcheon plate/control panel installed on a particular "MLS" transceiver limited the transceiver features the user could access. For example, the escutcheon plate corresponding to the "MLS" transceiver versions with 16-channel capability and no scan feature does not have a control to actuate the scan feature—preventing the user from obtaining the benefit of the scan feature. Similarly, the escutcheon plates corresponding to the 8-channel transceiver versions do not include user controls to access more than 8 channels.

Since all "MLS" transceivers included identical basic transceiver circuitry and main housing, reduced manufacturing costs and increased reliability derived from large scale manufacturing were obtained. Specific purchaser selected options could be provided in a particular unit simply by installing the appropriate escutcheon plate module —a procedure which could be performed in the field if desired. Incorporation of the circuitry performing the option functions and user controls interacting with such circuitry within the same front panel escutcheon plate module permitted a transceiver to be reconfigured by simply "unplugging" one module and "plugging in" a different module (further increasing reliability and decreasing manufacturing costs).

In this regard, see commonly assigned U.S. patent application Ser. No. 07/183,212 filed Apr. 19, 1988.

It is a principal object of this invention to provide a transceiver design which permits quick assembly of interchangeable front control panels and associated rubber keypads in order to convert an otherwise standard transceiver design to different versions of varying capabilities.

One advantage of the present invention is that a sixteen channel capacity unit, for example, can be configured as a four channel unit by installation of a four-key keypad and a four-key control panel, even though the unit has the capability of a sixteen channel unit. The final assembly of the control panel and keypad can be carried out easily and quickly at the point of distribution as required. As a result, otherwise standardized transceiver units can be configured quickly and simply, outside the manufacturing facility, so that unnecessary production delays need not be experienced while awaiting customer specifications.

Another advantageous aspect of the present invention lies in the fact that a standardized circuit including an array of switches, is enclosed within the housing, and that no circuitry or electrical components need be included in the keypad and/or control panel elements, with the exception of the conductive carbon buttons on the backside of respective keys of the keypad. This then permits conversion to various model designs merely by the utilization of low cost control panels and keypads, designed to selectively access some or all of the switch elements on the underlying circuit board.

It is another advantage of the present invention that the front control panel and keypad design flexibility allows future similar designs to be made quickly and cheaply to a standard product line transceiver.

In one exemplary embodiment of the invention, a relatively thin planar control panel defined by upper, lower and a pair of side edges, is provided with a projection, or locking bar, extending along and away from the upper edge of the panel. This projection is designed to be received in a recess provided within the transceiver unit housing. At the same time, a pair of apertures are provided adjacent the opposite or lower edge to receive a pair of screws to securely fasten the control panel to the front cover of the transceiver unit housing. A number of interchangeable control panels are provided, with different members and configurations of key apertures, depending on the desired end configuration for the unit.

In the exemplary embodiment, the locking bar extending upwardly and away from the upper edge of the control panel is centered between the side edges, but it will be appreciated that it may also extend along the entire length of the upper edge. The recess in which the locking bar is received is formed by a combination of the front cover of the unit housing, a display escutcheon plate located directly above the control panel, and the upper edge of the associated rubber keypad.

It is also a feature of the exemplary embodiment of the invention to provide a corresponding number of rubber keypads with identical peripheral shapes, but with different numbers of keys, again depending on the desired end configuration for the unit.

In order to fasten a selected control panel and corresponding keypad to the front cover of the unit, the keypad (preferably made of rubber or other suitable resilient material) is first placed in position within a recess provided in the front cover. The corresponding control panel is oriented such that the locking bar is slipped upwardly into the above described recess, and the panel is then pivoted downwardly and pressed into contact with the underlying keypad so that the screw holes provided in the control panel are aligned with corresponding screw holes in both the keypad and in the front cover of the housing. By merely inserting and tightening a pair of screws in these two screw holes, the front control panel cover is securely mounted to the housing, with the locking bar securely held underneath the display escutcheon plate. At the same time, the control panel cover captures the rubber keypad, pressing it down against the front housing cover to form a weatherproof seal.

It will be understood that the front control panel cover and associated keypad may be provided in a variety of configurations, for example they may be provided with sixteen holes to accommodate a sixteen-key keypad; four holes for accommodating a four-key keypad; a blank front control panel, i.e., one with no apertures for those applications where a blank keypad is employed, and so on. In converting the unit from one configuration to another, the electrical circuitry is not altered. What is altered is the degree of accessibility to the switch elements located within the unit.

Thus, in accordance with one aspect of the present invention, there is provided a control panel for a radio transceiver unit comprising a relatively thin, planar member having front and rear surfaces and defined by upper, lower and a pair of side edges; a projection extending along and away from at least one of the edges; and fastening means located adjacent an opposite edge.

In another aspect of the present invention, there is provided a radio transceiver comprising a housing having a front cover, a control panel mounted on the front cover, a keypad provided with a plurality of keys adapted to make electrical connection with a circuit located within the housing; and overlying the keypad, the control panel comprising a relatively thin, planar member having front and rear surfaces and defined by upper, lower and a pair of side edges; a plurality of apertures corresponding to and aligned with the plurality of keys; a locking bar extending along and away from one of the edges, and fastening means located adjacent an another edge, opposite to the one edge.

In still another aspect, the present invention comprises a housing including a front cover, an array of electrical switches located within the housing, a plurality of interchangeable control panels adapted for selective alternative attachment to the front cover, and a plurality of interchangeable keypads adapted for selective alternative attachment to the front cover in underlying relationship with a respective one of the control panels, wherein each control panel is configured for use with a similarly configured one of the keypads, and wherein said keypads are formed with different numbers of keys, respectively for accessing selected ones of the switches in said array.

In a related aspect, the present invention relates to a method of reconfiguring an otherwise standardized radio design comprising the steps of (a) providing a transceiver unit including a housing, the housing having a front cover adapted to receive a keypad and a control panel; (b) providing a circuit board within the housing, the circuit board including an array of switches; and (c) selecting a keypad and associated control panel which permits access to some or all of the switches, depending on the number of keys provided on the selected keypad.

As a result of the above described invention, different versions of otherwise standardized transceivers can be achieved quickly and simply through the utilization of the quick connect and disconnect front control panel covers as described herein. Additional objects and advantages of the present invention will become apparent from the detailed description of the invention which follows.

BRIEF DESCRIPTION OF THE DRAWINGS

FIG. 2 is a side view, partially in section, illustrating a control panel and associated keypad in accordance with the invention;

FIG. 3 is a partial rear view of a keypad in accordance with/the invention;

FIG. 6 is a side sectional view of the control panel illustrated in FIG. 5; and

DETAILED DESCRIPTION OF THE DRAWINGS

Figure 1:
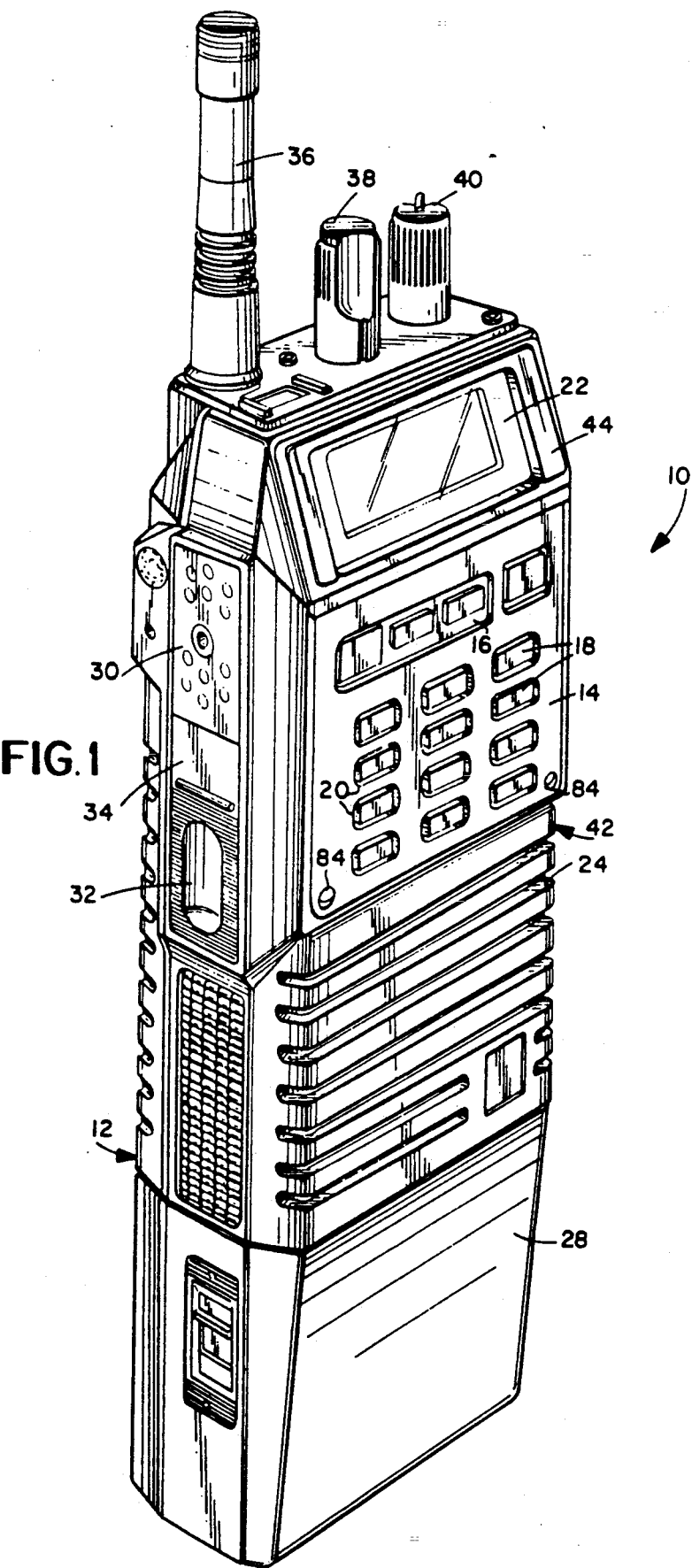
FIG. 1 is a perspective view of a radio transceiver unit incorporating the features of the present invention.

With reference to FIG. 1, a multi frequency radio transceiver unit 10 includes a metal housing 12 (which is preferably magnesium) having a front control panel 14 overlying a DTMF rubber keypad 16. The pad 16 has a number of individual keys 18 projecting through a corresponding plurality of apertures 20 in the control panel 14. An display 22 (preferably an LCD display) is mounted in an upper portion of the housing for viewing messages, channel names, status indicators, etc. A speaker grill 24 (which overlies a speaker and microphone not shown) is incorporated into the housing 12, directly below the control panel 14. A battery pack 28 is operatively attached to the lower portion of the housing, and is easily connected/disconnected for replacement of batteries as needed.

Other features and/or components include a programmer connector 30, a transmit button 32, monitor button 34, antenna 36, volume control knob 38 and frequency selector knob 40.

This invention is particularly concerned with the manner in which different style control panels and related keypads (such as 14, 16 respectively) can be interchanged on the front cover 42 of the housing 12.

A plastic display escutcheon plate 44 is mounted on the front of the housing overlying the display 22. As best seen in FIG. 2, the plate 44 is secured by four retaining screws 46 (only one of which are shown in FIG. 2) located at the respective corners of the plate.

In the exemplary embodiment shown in FIG. 1, keypad 16 is formed as a one-piece unit with sixteen (16) keys and is held in place by the front control panel 14 which is provided with sixteen apertures corresponding to the sixteen keys of the keypad 16. In other words, each of the individual keys 18 of the keypad 16 projects through a corresponding aperture 20 in the control panel 14. It will also be understood that the control panel 14 holds the rubber keypad in place when the control panel is secured to the front cover of the housing. Preferably, the rubber keypad is compressed by the control panel to form a water tight seal between the panel 14, keypad 16 and front housing cover 42.

Figure 4:
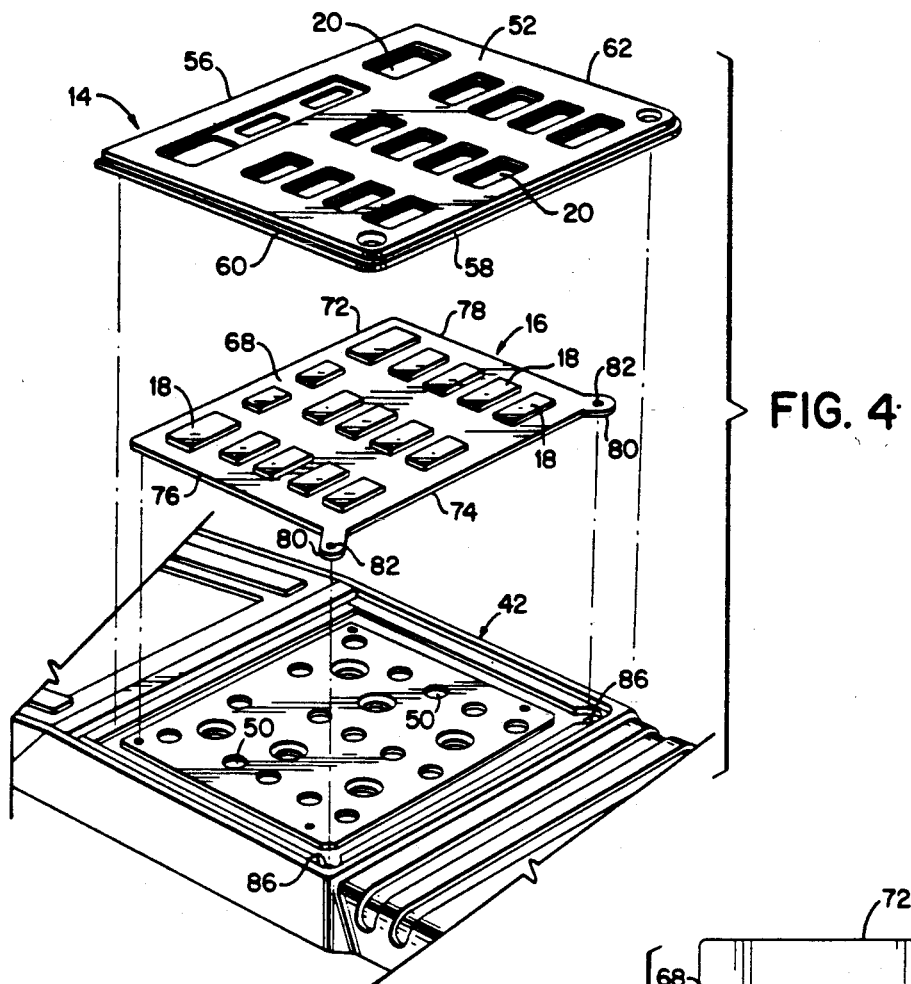
FIG. 4 is a partial exploded view of the housing cover, keypad, and control panel in accordance with the invention.
Figure 8:
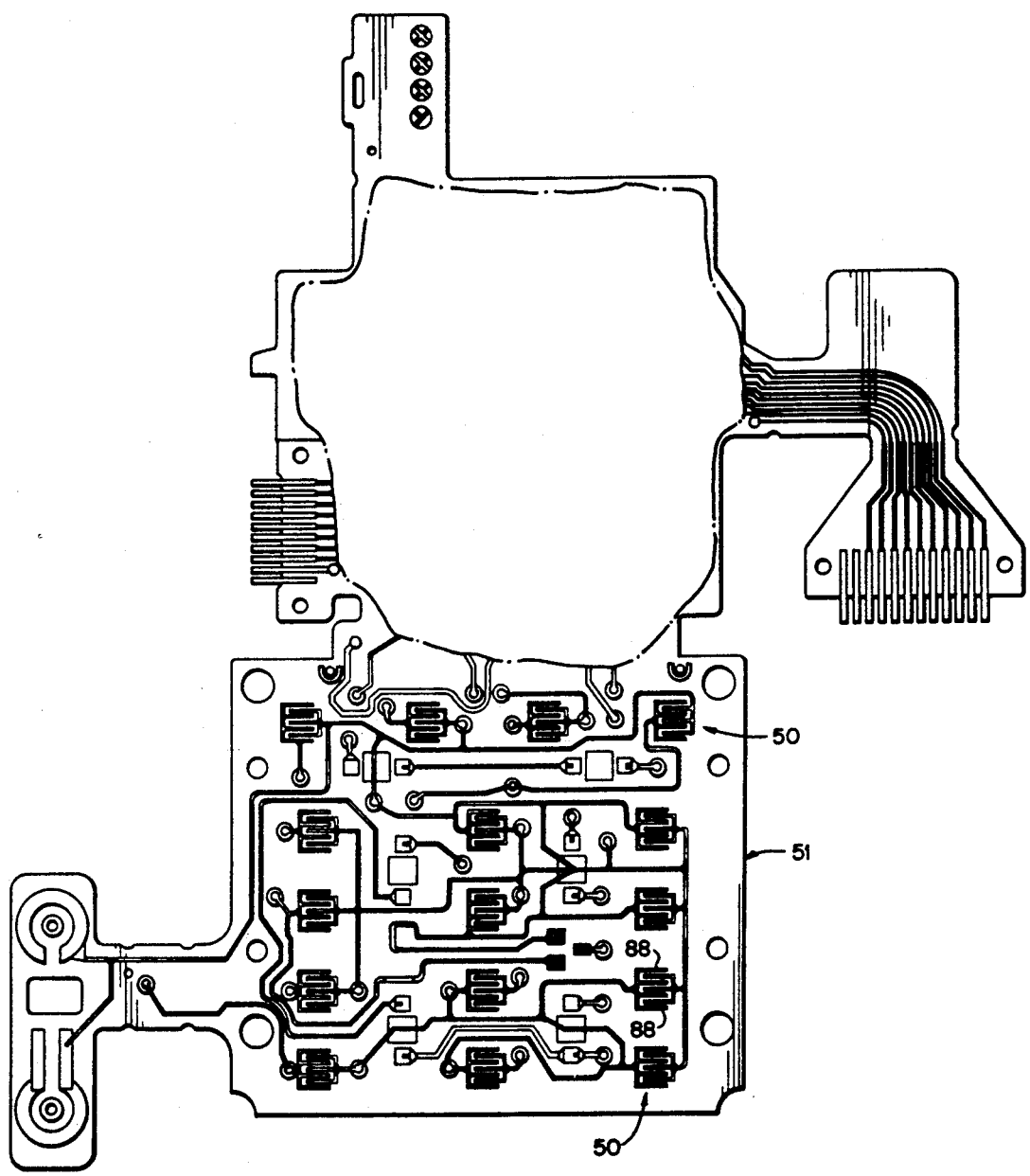
FIG. 8 is a plan view of a portion of a flexible circuit board including an array of switches in accordance with the invention.

With specific reference to FIGS. 2, 3 and 4, it may be seen that each key 18 is provided with a carbon conductive button 48 adapted to engage a corresponding switch 50 mounted on a board 51 within the housing upon depression of a key 18 (see also FIG. 8).

It will be understood that the radio transceiver unit as shown at 10 in FIG. 1 may be configured differently to suit customers' requirements. In accordance with this invention, differently designed control panels and keypad assemblies can be quickly assembled to an otherwise standardized transceiver unit housing with obvious benefits to manufacturing and inventory control procedures. In other words, a common housing with common internal electrical circuitry may be employed for several mobile transceiver units, the features and capabilities of which may vary. This requires a number of interchangeable rubber keypad and associated control panel designs. In this regard, the control panels 14 (FIGS. 1, 2, 4) 114 (FIGS. 5 and 6) and 214 (FIG. 7) differ only in the number and location of apertures provided therein. The peripheral edge and locking bar design as described below is common to each. Thus, each panel 14, 114 and 214 includes a front face 52, rear face 54, and peripheral edges 56, 58, 60 and 62. A pair of holes 64 are located adjacent the lower edge 58 at the intersecting edge 58 with side edges 60, 62.

A locking bar 66 is formed along at least a portion of the upper edge 56 and, as best seen in FIGS. 2 and 6, extends upwardly and away from the front face 52 to the extent of projecting out of the plane of the rear face 54. As best seen in FIG. 2, the locking bar 66 is receivable within a recess formed by the escutcheon plate 44, keypad 16 and front cover 42 of the housing.

Alternatively usable keypads 16, 116 and 216 are also identical to each other except for the number and location keys 18 formed therein. Thus, each pad includes a front face 68, rear face 70 (shown partially in FIG. 3) and peripheral edges 72, 74, 76 and 78. A pair of ears 80 are provided with apertures 82 and are adapted for alignment with holes 64 in the respective panels 14, 114 and 214.

In FIGS. 1, 2 and 4, a sixteen-key keypad 16 is shown with an associated control panel 14 provided with sixteen corresponding apertures 20.

Figure 5:
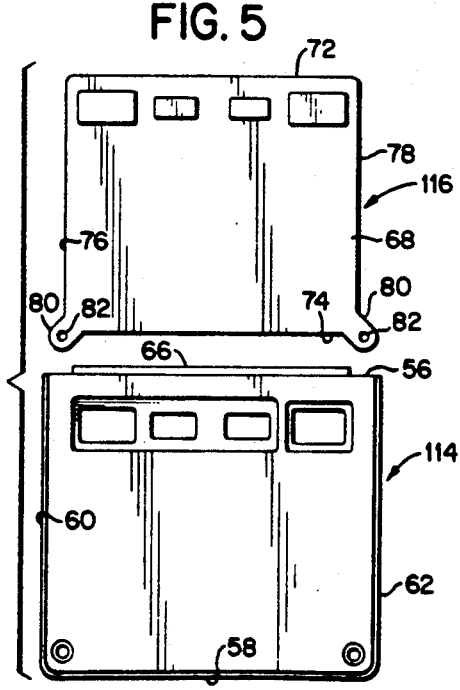
FIGS. 5 and 7 are front views of other embodiments of a control panel and associated keypad in accordance with the invention.

FIG. 5 illustrates a four-key rubber keypad 116 and an associated four-hole control panel 114. In this arrangement, it will be appreciated that the four keys make electrical contact with only four contacts 50 on the flexible circuit located within the housing behind the keypad.

Figure 7:
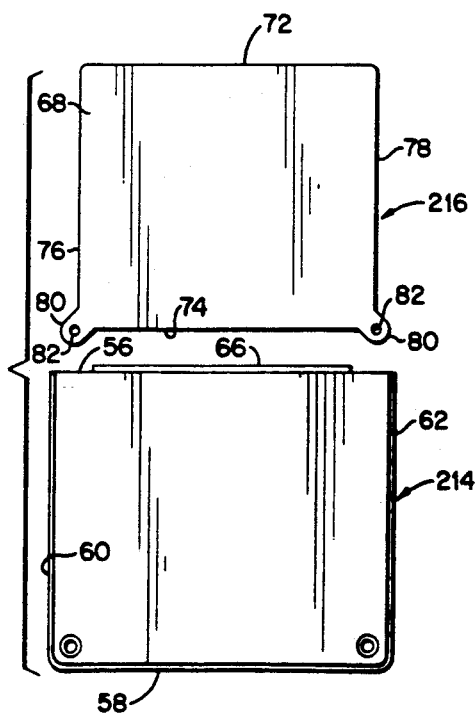

In FIG. 7, a blank keypad 216 is shown with an associated blank control panel 214. In this case, there is no opportunity to engage any contact behind the keypad.

It is apparent that many configurations of keypads and control panels can be employed in the otherwise standardized transceiver construction, and the three embodiments described herein are exemplary only.

With reference to FIG. 8, a flexible circuit board 51 is illustrated which includes an array of conventional switches 50 of the type which includes interdigitated paths 88. It is well understood by those skilled in the art that these switches will be activated upon contact with overlying carbon conductive buttons 48 upon depressing the latter.

Of significance is the fact that the complete and standardized electronic arrangement is incorporated within the transceiver unit, and that the units can be effectively reconfigured merely by selection of a particular, low cost keypad and associated control panel.

The particular manner in which the assembly of a transceiver unit is completed in accordance with this invention will now be described. Since the same procedure is employed to assemble or disassemble all of the above described keypads and control panels, only one need be described in detail. With reference to FIGS. 1 and 2, the keypad 16 may be placed within a correspondingly shaped recess provided in the front cover 42 of the housing 12. Thereafter, the control panel 14 is manipulated so that the locking bar 66 is first inserted upwardly into the recess formed by the display escutcheon plate 44, cover 42 and keypad 16. The panel 14 may then be rotated downwardly into full surface engagement with the keypad 16, and screws 84 (see FIG. 1) inserted through holes 64 and 82 and into threaded engagement with bores or holes 86 provided in the front cover 42 (see FIG. 4).

Upon tightening of the screws 84, the control panel 14 will compress the keypad 16 and form a weatherproof seal between the panel 14, keypad 16 and cover 42. Individual keys 18 may then be depressed as desired through holes 20 so that the carbon conductive buttons 48 will make electrical contact with corresponding contacts 50 of the flexible circuit within the housing. In this configuration, all of the underlying switches 50 may be selectively accessed. However, when units of lesser capability are required, a keypad and associated control panel with, for example, eight or four keys and apertures, respectively, may be employed to thereby limit access to the internal circuitry accordingly.

It will thus be appreciated that the present invention provides a degree of flexibility and adaptability heretofore unavailable in the field of mobile transceivers, permitting quick adaptation of already produced units to customer requirements.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of configuring an other wise standardized radio transceiver unit to one of a plurality of specific model designations, each with a different capability, the transceiver unit including a housing, the housing having a front cover for receiving a keypad formed with a plurality of keys and a control panel formed with apertures corresponding in number and arrangement to said keys, and a circuit board within said housing, said circuit board including a maximum number of switches arrayed thereon, said maximum number corresponding to one model designation of highest capability, said switches which are individually and directly accessible by individual ones of said keys, the method comprising the steps of:

a) providing a plurality of flexible keypads having varying numbers to keys equal to or less than said maximum number of switches, the keys of each keypad located and arranged to access respective ones of said switches;

b) providing a plurality of control panels, each having a plurality of apertures, wherein each keypad has an associated control panel with apertures arranged to receive the keys of a respective keypad; and c) selecting a keypad and associated control panel which permits access to a predetermined number of said switches, so that said standardized transceiver unit can be configured to said one model designation of highest capability or other model designations of lesser capability without altering said circuit board.

2. The method of claim 1 wherein said transceiver unit is a sixteen channel capacity unit, and wherein step (c) is carried out to configure said unit as a lesser channel capacity unit.

3. The method of claim 1 wherein said keys of said keypads are provided with carbon buttons for engaging corresponding switches on said circuit board.

4. The method of claim 1 wherein each control panel includes a relatively thin, planar member having front and rear faces and defined by upper, lower and a pair of side edges, and fastening means for securing said control panel to the housing including a locking bar located along one of said edges and extending in a direction away form said front face and projecting out of a plane containing said rear face, said locking bar configured to engage a recess in said housing, said fastening means further including at least one fastener receiving hole located adjacent another of said edges, opposite said one edge, and wherein, following step c) said selected keypad and control panel are secured to said housing.

* * * * *